July 25, 1961          J. KRITZ          2,993,373
ULTRASONIC FLOWMETERS AND TRANSDUCERS THEREFOR
Filed Sept. 18, 1956          3 Sheets-Sheet 1
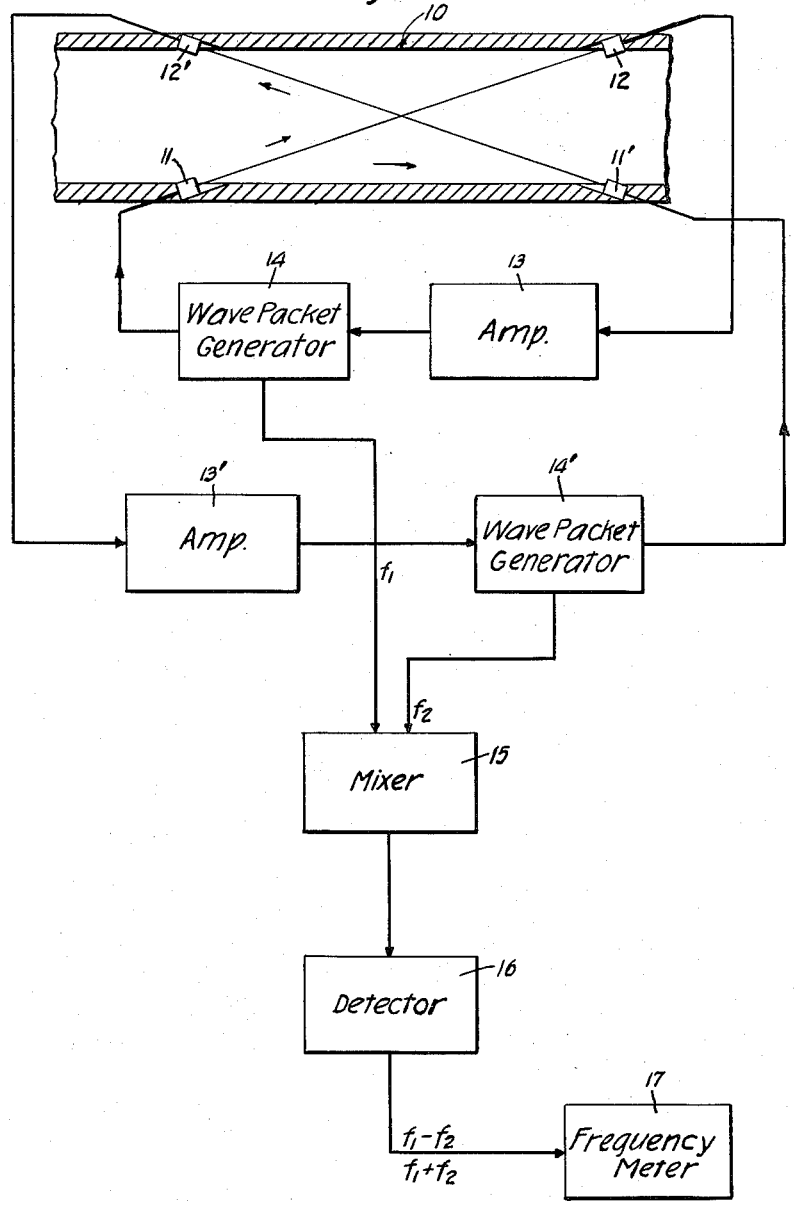
INVENTOR.
Jack Kritz
BY
Moses, Nolte & Nolte
ATTORNEYS July 25, 1961    J. KRITZ    2,993,373
ULTRASONIC FLOWMETERS AND TRANSDUCERS THEREFOR
Filed Sept. 18, 1956    3 Sheets-Sheet 2
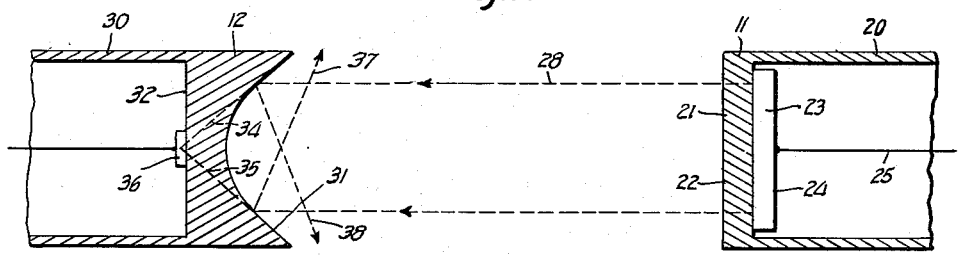
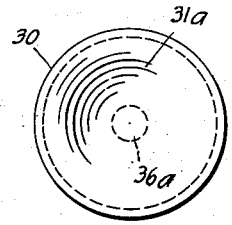
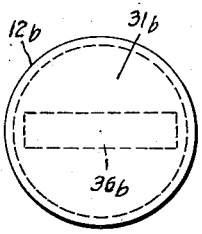
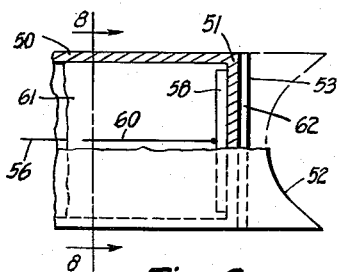
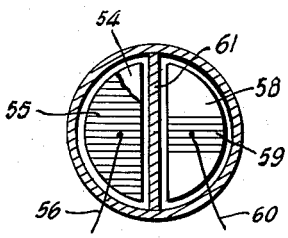
INVENTOR.
Jack Kritz
BY
Moses, Nolte & Nolte
ATTORNEYS

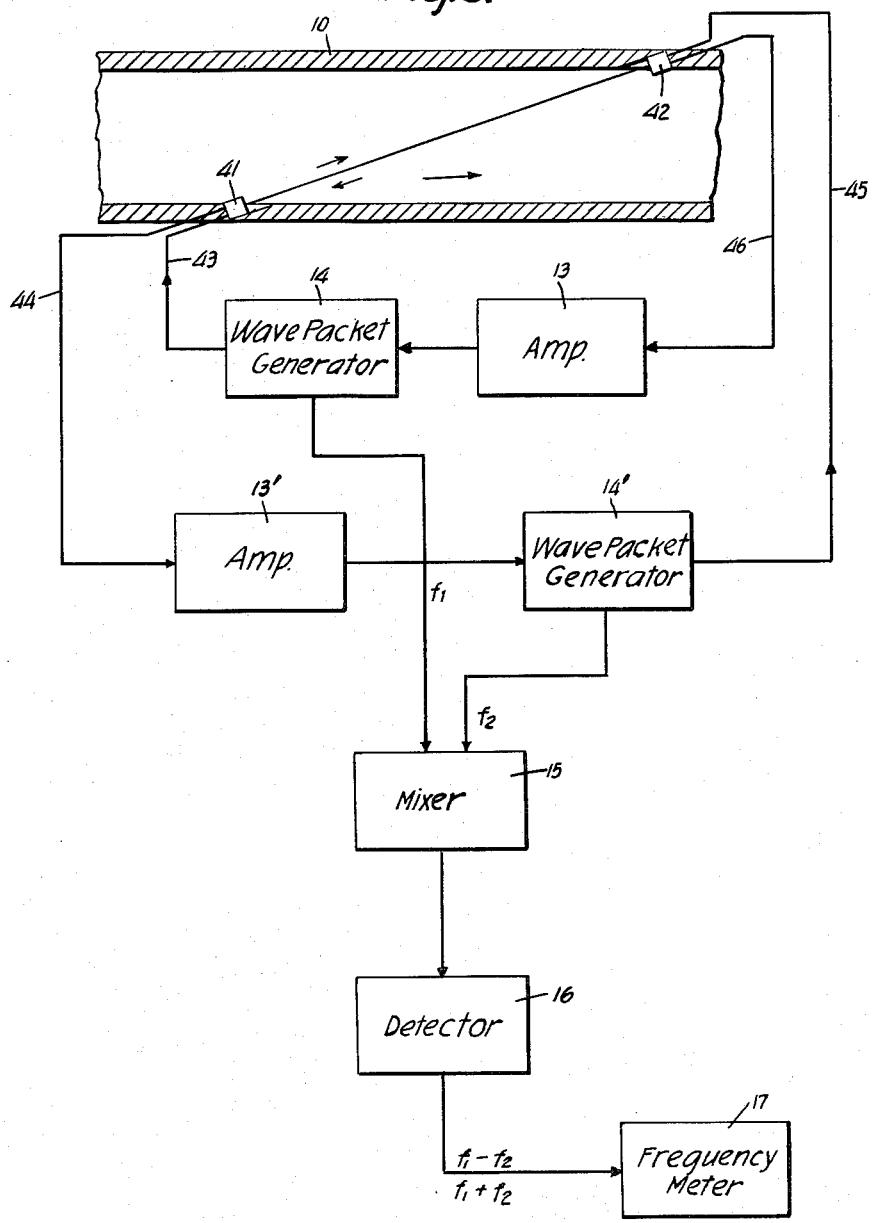

United States Patent Office 2,993,373
Patented July 25, 1961

2,993,373
ULTRASONIC FLOWMETERS AND TRANSDUCERS THEREFOR
Jack Kritz, 692 Sherman Court, Westbury, N.Y.
Filed Sept. 18, 1956, Ser. No. 610,551
6 Claims. (Cl. 73—194)

The present invention relates to ultrasonic flowmeters and to transducers for such flowmeters.

In flowmeters of the type disclosed in my application Serial No. 474,403 filed December 10, 1954, now Patent No. 2,949,772, utilizing wave packet techniques and employing metal faced transducers and dual transducers, certain difficulties may arise and remedies therefor are set forth in said application. The difficulties referred to are caused primarily by successive reflections of ultrasonic waves between parallel faces of the transducers. The reflected waves arrive at times which are coincident with the directly received wave packets, and they arbitrarily add or subtract from the level of the cycles of the received waves which are designed or intended to be below the triggering level of the wave packet generator, and may also add or subtract from those cycles of the directly received waves which are intended to trigger the wave packet generator. The reflected waves may thus cause improper firing of the wave packet generator unless design measures are taken to reduce their effectiveness. In dual transducer assemblies, the cross-talk reflections which introduce unwanted signals in one oscillating loop due to the operation of the other loop are important in reducing the effectiveness of the flowmeter.

The efforts or techniques for reducing the amplitudes of these reflections while being effective, require certain sacrifices and increased circuit complexities. In the case of single transducers, the interfering reflections make three trips and in the case of cross reflections with dual transducers, the interfering reflections make two trips, as against the one trip of the main signal through the fluid to be measured. Hence, increasing the attenuation per path length serves to improve the ratio of the main signal to the reflected signal. For example, if 6 db of attenuation is introduced per fluid path length, the self-reflected signals are attenuated 18 db and the cross-talk reflected signals are attenuated 12 db while the main signal is reduced 6 db. The penalty for this improvement, however, is a loss of 6 db in the main signal, requiring the use of higher gain in the receiver amplifiers. The increase of the attenuation can be brought about by raising the frequency of the ultrasonic vibrations, thereby increasing the fluid attenuation, or by cutting the metal faced transducers at a slant in order to introduce a radiation loss.

Another difficulty introduced by reflections may be illustrated by considering a flowmeter in which a wave packet generator is triggered by an early cycle of the received waves, for example, the first cycle, in order to attempt to remove any possibility of false firing and thereby eliminate the need of an automatic gain control circuit. In this case the wave amplitude used for triggering purposes become comparable to the reflection amplitudes. The reduction of these reflection amplitudes by designed attenuation and the consequent reduction of the main signal, requires vastly increased feedback loop gains in order to maintain fast rise times past the triggering values in lieu of automatic gain control circuits for maintaining stability of the firing time.

It is an object of the present invention to reduce undesired reflections without introducing or increasing path attenuation while increasing the gain of the main signal, or at least without reducing the gain of the main signal.

Another object of the invention is to reduce undesired reflection while retaining the advantages of mechanical protection and crystal transducer damping provided by metal faced transducers.

Still another object of the invention is to provide a flowmeter with dual metal faced transducers which reduce the amplitude of reflected received waves while increasing the transducer response to directly received waves.

Other objects and advantages of the invention will become apparent from the following description and the drawing in which:

FIG. 1 is a schematic diagram of a flowmeter according to the invention;

FIG. 2 is a diagram of one pair of transducers of the flowmeter shown in FIG. 1;

FIG. 3 is an end view of a hyperbolic receiving transducer;

FIG. 4 is an end view of another form of hyperbolic receiving transducer;

FIG. 5 is a schematic diagram of a flowmeter utilizing dual transducers;

FIG. 6 is a partly sectional view taken along the line 6—6 of FIG. 7 showing a dual transducer for use in FIG. 5;

FIG. 7 is an end view of the transducer shown in FIG. 6; and

FIG. 8 is a sectional view taken along the line 8—8 of FIG. 6.

In FIG. 1, an embodiment of the invention is illustrated utilizing four transducers mounted in a fluid conduit 10 for producing upstream and downstream transmission. The transmitting transducer 11 is arranged to transmit waves downstream to the receiving transducer 12, while transducer 11' transmits to receiver 12' in the upstream direction. The waves received by transducer 12 are impressed on amplifier 13, and the amplified waves are supplied to a wave packet generator 14 of the type described in my application Serial No. 474,403, now Patent No. 2,949,772. When the amplified wave impressed on generator 14 reaches a predetermined amplitude, generator 14 is triggered and responds by producing a limited train of waves, or a wave packet. The wave packet is then impressed on transmitter 11, and after being propagated through the fluid is received by receiver 12 and transmitted through amplifier 13 to generator 14. Generator 14 is thereby triggered again, and in this manner repeated wave packets are produced. The transducers 11', 12', amplifier 13' and wave packet generator 14' similarly produce a continuous sequence of wave packets which travel through the fluid in the upstream direction.

Mixer 15 has its two input terminals connected to outputs of generators 14 and 14' respectively, and is provided with pulse signals whose repetition frequencies are $f_1$ and $f_2$, where $f_1$ is the repetition frequency of the wave packets at the generator 14 and $f_2$ is the repetition frequency of the wave packets at generator 14'. The mixed signals are fed to a detector 16 which produces in its output, signals, representing the algebraic sum of the two frequencies. The mixer-detector combination is a form of heterodyne converter or any other circuit capable of producing an output current having components of a frequency equal to the sum of $f_1$ and $f_2$ and a frequency equal to the difference between $f_1$ and $f_2$. Either of these frequency components is selected and fed to a frequency meter 17. The arithmetic difference $f_1-f_2$ is directly proportional to the flow velocity of the fluid independently of the propagation velocity of the acoustic waves therein. Similarly the arithmetic sum $f_1+f_2$ is directly proportional to the propagation velocity of the waves in the fluid independently of the velocity of flow of the fluid.

Transmitting transducer 11 and receiving transducer 12, FIG. 1, may be of the form shown in FIG. 2. Another pair of transducers of the type illustrated in FIG. 2 may constitute transducers 11', 12' in FIG. 1. Transducer 11 may include a cylindrical housing 20 having a metallic end wall 21. End wall 21 is integral with housing 20 and the entire housing may be metallic. End wall 21 is designed in accordance with the principles set forth in my previously mentioned application No. 474,403. Wall 21 has a plane outer face 22 in acoustic contact with the fluid. On the inside face of wall 21 there is mounted a piezoelectric crystal 23 having a suitable electrode 24 on its inner face and an input connection 25 adapted to be connected to electrode 24. When properly dimensioned, the wall 21 loads the crystal 23 so as to provide a desirable damping characteristic therefor and thus causes the amplitudes of the early cycles of the wave packets to build up rapidly and to enable the later cycles of the wave packet to maintain a rather uniform amplitude. When a packet of electrical oscillations are supplied from the wave packet generator over the conductor 25 to the crystal 23, transducer 20 transmits a beam 28 of acoustic waves to receiving transducer 12. Transducer 12 includes a housing 30 which may be similar to housing 20 of transducer 11 except that the outer face 31 of wall 32 is hyperbolic. Face 31 may be a hyperboloid of revolution as illustrated at 31a in FIG. 3 or it may be in the form of a cylindrical hyperboloid 31b illustrated in FIG. 4. By virtue of the hyperbolic face 31, wall 32 focuses the incident beam 28 as indicated by dashed lines 34 and 35 onto a piezoelectric crystal 36. Where the hyperbolic face is a hyperboloid of revolution 31a, a circular crystal 36a is used and when the face is a cylindrical hyperboloid 31b, crystal 36b may be in the form of a strip extending in a direction parallel to the axis of the cylindrical hyperboloid.

With a knowledge of the ultrasonic propagation velocities of the fluid and the lens formed by wall 32, it will be understood by those skilled in the art that the hyperboloid can be readily designed and dimensioned to focus all incident parallel rays from transducer 11 on receiving crystal 36. The reflected rays from hyperbolic face 31 diverge sharply as indicated by the lines 37 and 38 and either do not impinge on transducer 11, or, for the most part, are reflected back to the transducer 11 at a sharp angle to the face 22, so that the returned echoes to the receiving transducer 12 are very greatly reduced. Furthermore, since substantially all direct rays are focused on the receiving crystal 36, there is no loss in the main beam. In fact a large increase in the amplitude of the response to the main beam is realized if the effective area of crystal 36 is made small by using a small diameter crystal or plating a small central area on a larger crystal. This effective gain is caused by the fact that the gain is a function of the received energy and of the shunting crystal capacity. With the focusing arrangement shown in FIG. 2, the shunting capacity of the crystal can be reduced by many orders of magnitude, while the total received energy remains the same. It should be noted that the focus does not have to be exact. If fluids or varying values of propagation velocity are to be accommodated, the hyperboloid is designed so that for the fluid having minimum acoustic propagation velocity, the angles of reflection do not exceed the critical angle of reflection, and then the critical angle of reflection will not be exceeded for any other fluid, although the focal distance will increase slightly.

Referring to FIG. 5, there is shown a flowmeter similar to that of FIG. 1 and like reference numeral designate similar components in the two figures. The principal difference between the flowmeters of FIG. 1 and FIG. 5 is that transducers 41 and 42 are dual transducers, each containing a transmitting crystal and a receiving crystal arranged in a manner which will be described in detail below. The transmitting crystal of transducer 41 is connected by a lead 43 to wave packet generator 14 and the receiving crystal of transducer 41 has a connection 44 to amplifier 13'. Similarly the transmitting crystal of transducer 42 is supplied with oscillations from wave packet generator 14' over connection 45. The receiving crystal of transducer 42 supplies electrical oscillations to amplifier 13 over connection 46. The remaining elements of the flowmeter shown in FIG. 5 function in the same manner as corresponding elements of FIG. 1 and therefore require no further description.

A suitable form of dual transducer for the flowmeter shown in FIG. 5 is illustrated in FIGS. 6-8. A metallic housing 50 which may be cylindrical in cross-section has an end wall 51, one semi-circular portion of end wall 51 is in the form of the hyperbolic cylinder 52 while the other semi-circular portion of wall 51 has a plane face 53. A transmitting crystal 54 is juxtaposed to the portion 53 of wall 51. Crystal 54 may be semi-circular and is provided with an electrode 55 which may have a connection 56 to one of the wave packet generators 14 or 14'. Juxtaposed to the hyperbolic portion 52 of wall 51, is a receiving piezoelectric crystal 58 provided with the usual electrode 59 having a connection 60 which extends to one of the amplifiers 13 or 13'. Crystal 58, if desired, may also be substantially semi-circular or in the form of a strip, but in any event the electrode 59 thereof is in the form of a narrow rectangular strip extending parallel to the axis of hyperbolic cylinder 52. Between crystals 54 and 58, there is a metallic partition 61 which shields one of the crystals from the other and prevents cross-talk between them. The receiving and transmitting crystals are further de-coupled from each other by a diametrical groove 62 extending between the semi-circular portions 52 and 53 of wall 51. The function of groove 62 is to introduce acoustic attenuation between the crystals so as to prevent one of the crystals from acoustically exciting the other crystal.

It will be understood that two crystals of the type illustrated in FIGS. 6 to 8 are used in FIG. 5. Each transducer serves as a transmitting transducer for one feedback loop and a receiving transducer for the other feedback loop. Dual transducers have the important advantages of providing equal paths in both directions and greatly simplifying the mechanical construction of the flowmeter. The hyperbolic portion 52 of wall 51 and the crystal 58 function similarly to the hyperbolic receiving transducers of FIGS. 2, 3 and 4. While the portion 53 of wall 51 and the transmitting crystal 54 function similarly to the plane faced transducer 11 of FIG. 2.

I have described what I believe to be the best embodiments of my invention. I do not wish, however, to be confined to the embodiments shown, but what I desire to cover by Letters Patent is set forth in the appended claims.

I claim:

1. In a flowmeter comprising first and second crystal transmitters and first and second crystal receivers in acoustic contact with a fluid stream, said first transmitting crystal and said first receiving crystal being spaced apart a predetermined distance and so located with respect to each other that the direction of transmission therebetween has at least a component in the direction of fluid flow, said second transmitting crystal and said second receiving crystal being spaced apart by said predetermined distance so located with respect to each other that the direction of transmission therebetween has at least a component opposite to the direction of fluid flow, a first feedback path connected between said first receiving crystal and said first transmitting crystal, a second feedback path connected between said second receiving crystal and said second transmitting crystal, and means connected to said feedback paths for measuring the difference between the frequencies of the signals therein, the improvement comprising a plurality of housings each having an end wall in contact with the fluid, each receiving crystal being mounted on the inner face of the end wall of one of said housings, said end wall having a hyperbolic concave outer face dimensioned so as to focus received acoustic waves passing through said end wall on the crystal mounted on said end wall, the area of each receiving crystal being small relative to the effective aperture of the hyperbolic face associated therewith.

2. Apparatus according to claim 1, wherein each receiving crystal is provided with an electrode having an area which is small relative to the effective aperture of the hyperbolic face associated with that crystal.

3. Apparatus according to claim 1, wherein the hyperbolic face is dimensioned so that the angle of incidence of received waves is less than the critical angle of reflection for the fluid.

4. In a flowmeter comprising first and second crystal transmitters and first and second crystal receivers in acoustic contact with a fluid stream, said first transmitting crystal and said first receiving crystal being spaced apart a predetermined distance and so located with respect to each other that the direction of transmission therebetween has at least a component in the direction of fluid flow, said second transmitting crystal and said second receiving crystal being spaced apart by said predetermined distance so located with respect to each other that the direction of transmission therebetween has at least a component opposite to the direction of fluid flow, a first feedback path connected between said first receiving crystal and said first transmitting crystal, a second feedback path connected between said second receiving crystal and said second transmitting crystal, and means connected to said feedback paths for measuring the difference between the frequencies of the signals therein, the improvement comprising a plurality of housings each having an end wall in contact with the fluid, each receiving crystal being mounted on the inner face of the end wall of one of said housings, said end wall having a hyperbolic concave outer face dimensioned so as to focus received acoustic waves passing through said end wall on the crystal mounted on said end wall, the first transmitting crystal and the second receiving crystal are mounted on the end wall of the same housing, the portion of the outer face of said wall adjacent the receiving crystal thereon being concavely hyperbolic and the portion of said outer face of said wall adjacent the transmitting crystal thereon being plane, the second transmitting crystal and the first receiving crystal being mounted within a second housing and on the end wall thereof, the portion of the outer face of said last mentioned wall adjacent the receiving crystal thereon being concavely hyperbolic and the portion of the face of said last mentioned wall adjacent the transmitting crystal being plane, said housings being metallic.

5. In a flowmeter comprising first and second crystal transmitters and first and second crystal receivers in acoustic contact with a fluid stream, said first transmitting crystal and said first receiving crystal being spaced apart a predetermined distance and so located with respect to each other that the direction of transmission therebetween has at least a component in the direction of fluid flow, said second transmitting crystal and said second receiving crystal being spaced apart by said predetermined distance so located with respect to each other that the direction of transmission therebetween has at least a component opposite to the direction of fluid flow, a first feedback path connected between said first receiving crystal and said first transmitting crystal, a second feedback path connected between said second receiving crystal and said second transmitting crystal, and means connected to said feedback paths for measuring the difference between the frequencies of the signals therein, the improvement comprising a plurality of housings each having an end wall in contact with the fluid, each receiving crystal being mounted on the inner face of the end wall of one of said housings, said end wall having a hyperbolic concave outer face dimensioned so as to focus received acoustic waves passing through said end wall on the crystal mounted on said end wall, the receiving crystal in each housing is in the form of a narrow strip and the hyperbolic portion of the face of each housing is in the form of a cylindrical hyperboloid dimensioned to focus received waves on said strip.

6. In a flowmeter, a dual transducer comprising a cylindrical metallic housing having an end wall, a substantially semi-circular transmitting crystal mounted within said housing on the end wall, a receiving crystal mounted within said housing on said end wall, said receiving crystal having a strip-like electrode extending radially with respect to the axis of said housing, a metallic partition within said housing between the receiving crystal and the transmitting crystal, a substantially semi-circular portion of the outer face of said wall adjacent the transmitting crystal being plane and the remaining portion of said outer face being in the form of a hyperbolic cylinder, a diametrical groove in said wall separating the plane portion from the hyperbolic portion of said face and having sufficient depth to provide appreciable decoupling between the receiving and transmitting crystals.

References Cited in the file of this patent

UNITED STATES PATENTS

| | | |
|---|---|---|
| 2,283,285 | Pohlman | May 19, 1942 |
| 2,292,424 | Abrahams | Aug. 11, 1942 |
| 2,423,459 | Mason | July 8, 1947 |
| 2,484,014 | Peterson et al. | Oct. 11, 1949 |
| 2,669,121 | Garman et al. | Feb. 16, 1954 |
| 2,748,369 | Smyth | May 29, 1956 |
| 2,761,117 | Green | Aug. 28, 1956 |
| 2,863,075 | Fry | Dec. 2, 1958 |

OTHER REFERENCES

Article, by P. J. Ernst, Journal of Scientific Instruments, vol. 22, 1945, page 238.